United States Patent
Neudorf

(10) Patent No.: US 9,497,522 B2
(45) Date of Patent: Nov. 15, 2016

(54) FLEXIBLE SMART SLEEVE SYSTEMS AND METHODS FOR PLUGGABLE TRANSCEIVERS

(71) Applicant: Kenneth Edward Neudorf, Carp (CA)

(72) Inventor: Kenneth Edward Neudorf, Carp (CA)

(73) Assignee: Ciena Corporation, Hanover, MD (US)

( * ) Notice: Subject to any disclaimer, the term of this patent is extended or adjusted under 35 U.S.C. 154(b) by 81 days.

(21) Appl. No.: 14/462,983

(22) Filed: Aug. 19, 2014

(65) Prior Publication Data

US 2016/0057518 A1 Feb. 25, 2016

(51) Int. Cl.
*G02B 6/00* (2006.01)
*H04Q 11/00* (2006.01)
*G02B 6/42* (2006.01)

(52) U.S. Cl.
CPC ......... *H04Q 11/0062* (2013.01); *G02B 6/4278* (2013.01); *G02B 6/4292* (2013.01); *H04Q 11/0003* (2013.01); *H04Q 2011/0079* (2013.01)

(58) Field of Classification Search
CPC ......... H04Q 11/0062; H04Q 11/0003; H04Q 2011/0079; G02B 6/4292; G02B 6/4278
See application file for complete search history.

(56) References Cited

U.S. PATENT DOCUMENTS

| | | | | |
|---|---|---|---|---|
| 7,974,537 B2* | 7/2011 | Li | | H04B 10/40 398/135 |
| 8,107,821 B2* | 1/2012 | El-Ahmadi | | H04J 3/1652 398/128 |
| 8,280,249 B2* | 10/2012 | Friedrich | | H04Q 11/0005 398/33 |
| 8,533,784 B2* | 9/2013 | Bugenhagen | | H04L 63/10 709/220 |
| 8,566,643 B2* | 10/2013 | Miller | | G06F 11/28 714/27 |
| 2004/0247250 A1* | 12/2004 | Lee | | G02B 6/3874 385/55 |
| 2006/0209886 A1* | 9/2006 | Silberman | | H01R 31/065 370/466 |
| 2008/0290085 A1* | 11/2008 | Schlipf | | H05B 3/06 219/526 |
| 2009/0214221 A1* | 8/2009 | Li et al. | | H04B 10/40 398/136 |
| 2010/0153550 A1* | 6/2010 | Diab | | G06F 21/85 709/225 |
| 2010/0280858 A1* | 11/2010 | Bugenhagen | | H04L 43/00 705/50 |
| 2011/0200051 A1* | 8/2011 | Rivaud | | H04J 3/0641 370/400 |
| 2012/0099870 A1* | 4/2012 | Luo | | G02B 6/4246 398/135 |
| 2012/0182900 A1* | 7/2012 | Davari | | H04L 12/10 370/254 |
| 2012/0301134 A1* | 11/2012 | Davari | | H04L 41/5038 398/9 |
| 2013/0230278 A1* | 9/2013 | Hung | | G02B 6/12 385/14 |
| 2013/0330079 A1* | 12/2013 | Kauffeldt | | H04J 14/0275 398/79 |
| 2014/0169785 A1* | 6/2014 | Roullot | | H04B 10/40 398/25 |

(Continued)

OTHER PUBLICATIONS

"10 Gigabit Small Form Factor Pluggable Module," SFF Committee, Aug. 31, 2005, pp. 1-192.

(Continued)

*Primary Examiner* — Danny Leung
(74) *Attorney, Agent, or Firm* — Clements Bernard PLLC; Christopher L. Bernard; Lawrence A. Barratta, Jr.

(57) ABSTRACT

A flexible smart sleeve system for a pluggable transceiver includes a pluggable sleeve configured to selectively engage a pluggable transceiver; a smart enclosure configured to selectively engage a host device, wherein the host device is configured for the pluggable transceiver; and a flexible cable connecting the pluggable sleeve to the smart enclosure. A network with a flexible smart sleeve system for a pluggable transceiver includes a network switch; a customer premises switch comprising a host cage configured for the pluggable transceiver; and a flexible smart sleeve system configured to engage the host cage and to engage the pluggable transceiver, wherein the flexible smart sleeve system is configured to provide Operations, Administration, and Maintenance (OAM) to the network switch.

17 Claims, 5 Drawing Sheets

(56) References Cited

U.S. PATENT DOCUMENTS

2014/0379016 A1* 12/2014 Zhang ............... A61B 5/1519
606/182
2015/0003793 A1* 1/2015 Lee ..................... H01R 31/065
385/92

OTHER PUBLICATIONS

Daines, "EFM OAM Tutorial," Jul. 2003, pp. 1-34.
"Ethernet Demarcation SFP MiNID—RAD," found at http://www.rad.com/10/Ethernet-Demarcation-SFP/24944/.
"INF-8074i Specification for SFP (Small Formfactor Pluggable) Transceiver," SFF Committee, May 12, 2001, pp. 1-38.
"INF-8474i Specification for Xenpak 10 Gigabit Ethernet Transceiver," SFF Committee, Sep. 18, 2002, pp. 1-81.
"INF-8476i Specification for X2 10 Gigabit Ethernet Transceiver," SFF Committee, Apr. 7, 2005, pp. 1-34.
"SFF-8431 Specifications for Enhanced Small Form Factor Pluggable Module SFP+," SFF Committee, Jul. 6, 2009, pp. 1-132.
"White Paper: The PacketPortal—Enabled SFProbe and How it Differs from a Standard SFP Transceiver," JDSU, pp. 1-4.
Bradner et al., "Benchmarking Methodology for Network Interconnect Devices," Network Working Group, Mar. 1999, pp. 1-31.
Hedayat et al., "A Two-Way Active Measurement Protocol (TWAMP)," Network Working Group, Oct. 2008, pp. 1-26.
"OAM functions and mechanisms for Ethernet based networks," International Telecommunication Union, Nov. 2013, pp. 1-99.

* cited by examiner

FLEXIBLE SMART SLEEVE SYSTEMS AND METHODS FOR PLUGGABLE TRANSCEIVERS

FIELD OF THE DISCLOSURE

The present disclosure relates generally to networking systems and methods. More particularly, the present disclosure relates to a smart sleeves which can be used with Small Form-factor Pluggable (SFP) modules, 10 Gigabit Small Form Factor Pluggable Module (XFP), and the like.

BACKGROUND OF THE DISCLOSURE

The Small Form-factor Pluggable (SFP) is a compact, hot-pluggable transceiver used for both telecommunication and data communications applications with its form factor and electrical interface specified by a Multi-Source Agreement (MSA). Advantageously, SFP modules can be sourced from various manufacturers for use with SFP-compliant devices. A smart SFP is an SFP which contains a Field Programmable Gate Array (FPGA) or Application Specific Integrated Circuit (ASIC) for Operations, Administration, and Maintenance (OAM) functionality along with an SFP component. That is, the smart SFP exemplarily introduces Ethernet OAM packets into data over the SFP. In this manner, the smart SFP enables some OAM functions in Ethernet devices that do not support OAM, such as lower-end Customer Premises Equipment (CPE) and the like. Conventionally, there are two hardware approaches to smart SFPs, namely 1) integrated smart SFP, and 2) smart SFP sleeves, and there are disadvantages with both approaches. For the integrated smart SFP, the end user cannot use their SFP of choice, i.e., the end user must use the SFP that comes with the integrated smart SFP.

Disadvantageously, the end users spend a lot of time testing SFPs before they approve them for use, and they may not want to be forced to use the SFP that comes with the integrated smart SFP. The smart SFP sleeve fixes this problem by letting the end users use any SFP, but it also adds a different problem, i.e., length. The smart SFP sleeve may be too long for installations which have a door on the cabinet which are common in CPE environments and the like. The smart SFP sleeve may stick out of the switch box by as much as the entire length of the SFP—and this can be farther out than the space between the front of the cabinet to the back of the door on the cabinet. This means a lot of installations cannot use this type of SFP as well. Additionally, both of the integrated smart SFP and the smart SFP sleeve have a common disadvantage in that they require effort to integrate into management platforms.

Note, in addition to SFP, there are various other pluggable transceiver MSAs such as, without limitation, enhanced Small Form-factor Pluggable (SFP+), 10 Gigabit Small Form Factor Pluggable (XFP), XENPAK, etc. It would be advantageous to have smart sleeve systems and methods that overcome the aforementioned limitations for SFP, SFP+, XFP, and the like.

BRIEF SUMMARY OF THE DISCLOSURE

In an exemplary embodiment, a flexible smart sleeve system for a pluggable transceiver includes a pluggable sleeve configured to selectively engage a pluggable transceiver; a smart enclosure configured to selectively engage a host device, wherein the host device is configured for the pluggable transceiver; and a flexible cable connecting the pluggable sleeve to the smart enclosure. The flexible smart sleeve system can further include circuitry configured to perform Operations, Administration, and Maintenance (OAM) with a network switch communicatively coupled to the pluggable transceiver. Optionally, the circuitry can be disposed in the pluggable sleeve. Alternatively, the circuitry can be disposed in the smart enclosure. The network switch can be communicatively coupled to a network management system and provides OAM from the flexible smart sleeve system to the network management system. The circuitry can include a Field Programmable Gate Array (FPGA) configured to perform OAM and flash memory configured to store data associated with OAM. The OAM can utilize any of ITU-T Recommendation G.8013/Y.1731 (November 2013), IETF RFC 2544 (March 1999), IEEE 1588-2002 and IEEE 1588-2008, and IETF RFC5357 (October 2008).

The smart enclosure can include first connectors to engage the host device for power and data, wherein the pluggable sleeve can include second connectors, and wherein the flexible cable is configured to connect the first connectors to the second connectors. Optionally, the pluggable transceiver can be one of a Small Form-factor Pluggable (SFP) module, a 10 Gigabit Small Form Factor Pluggable Module (XFP), and an Enhanced SFP (SFP+) module. The smart enclosure can be inserted in a customer premises located client device and the pluggable sleeve dangles in front of the customer premises located switch by the flexible cable. The flexible smart sleeve system can further include circuitry configured to perform Operations, Administration, and Maintenance (OAM) with a network switch communicatively coupled to the pluggable transceiver; and an external power connection configured to provide additional power in addition to power from the host device to the smart enclosure, wherein the additional power is utilized to power the circuitry. The external power connection can be a Universal Serial Bus (USB) connection or a connection to an unused port on the host device.

In another exemplary embodiment, a network with a flexible smart sleeve system for a pluggable transceiver includes a network switch; a customer premises switch comprising a host cage configured for the pluggable transceiver; and a flexible smart sleeve system configured to engage the host cage and to engage the pluggable transceiver, wherein the flexible smart sleeve system is configured to provide Operations, Administration, and Maintenance (OAM) to the network switch. The flexible smart sleeve system can include a pluggable sleeve configured to selectively engage the pluggable transceiver; a smart enclosure configured to selectively engage the host cage, wherein the host cage is configured to receive the pluggable transceiver; and a flexible cable connecting the pluggable sleeve to the smart enclosure. The flexible smart sleeve system can further include circuitry disposed in the pluggable sleeve or in the smart enclosure, wherein the circuitry is configured to perform the OAM. The network switch can be communicatively coupled to a network management system and provides the OAM from the flexible smart sleeve system to the network management system. The OAM is exchanged between the flexible smart sleeve system and the network switch, and the OAM is not provided to the customer premises switch. The OAM can utilize any of ITU-T Recommendation G.8013/Y.1731 (November 2013), IETF RFC 2544 (March 1999), IEEE 1588-2002 and IEEE 1588-2008, and IETF RFC5357 (October 2008). The customer premises switch can have a cover and the flexible smart sleeve system is installed in the customer premises switch enabling the cover to close.

In a further exemplary embodiment, a method with a flexible smart sleeve system for a pluggable transceiver includes inserting a smart enclosure of the flexible smart sleeve system in a host device; and inserting the pluggable transceiver in a pluggable sleeve of the flexible smart sleeve system, wherein the pluggable sleeve is connected to the smart enclosure through a flexible cable, wherein the flexible cable extends power and data from the smart enclosure to the pluggable sleeve.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, flexible smart sleeve systems and methods are described providing a flexible sleeve for SFP, XFP, SFP+, and the like. The flexible smart sleeve systems and methods provide end customers full flexibility to use the pluggable module of their choice, installs in current host devices and does not stick out, enables optical cable routing in any direction, and the like. The flexible smart sleeve systems and methods provide advanced OAM functionality, such as Ethernet OAM, in switches that do not already support such functionality thereby providing better visibility to client devices.

Figure 1:
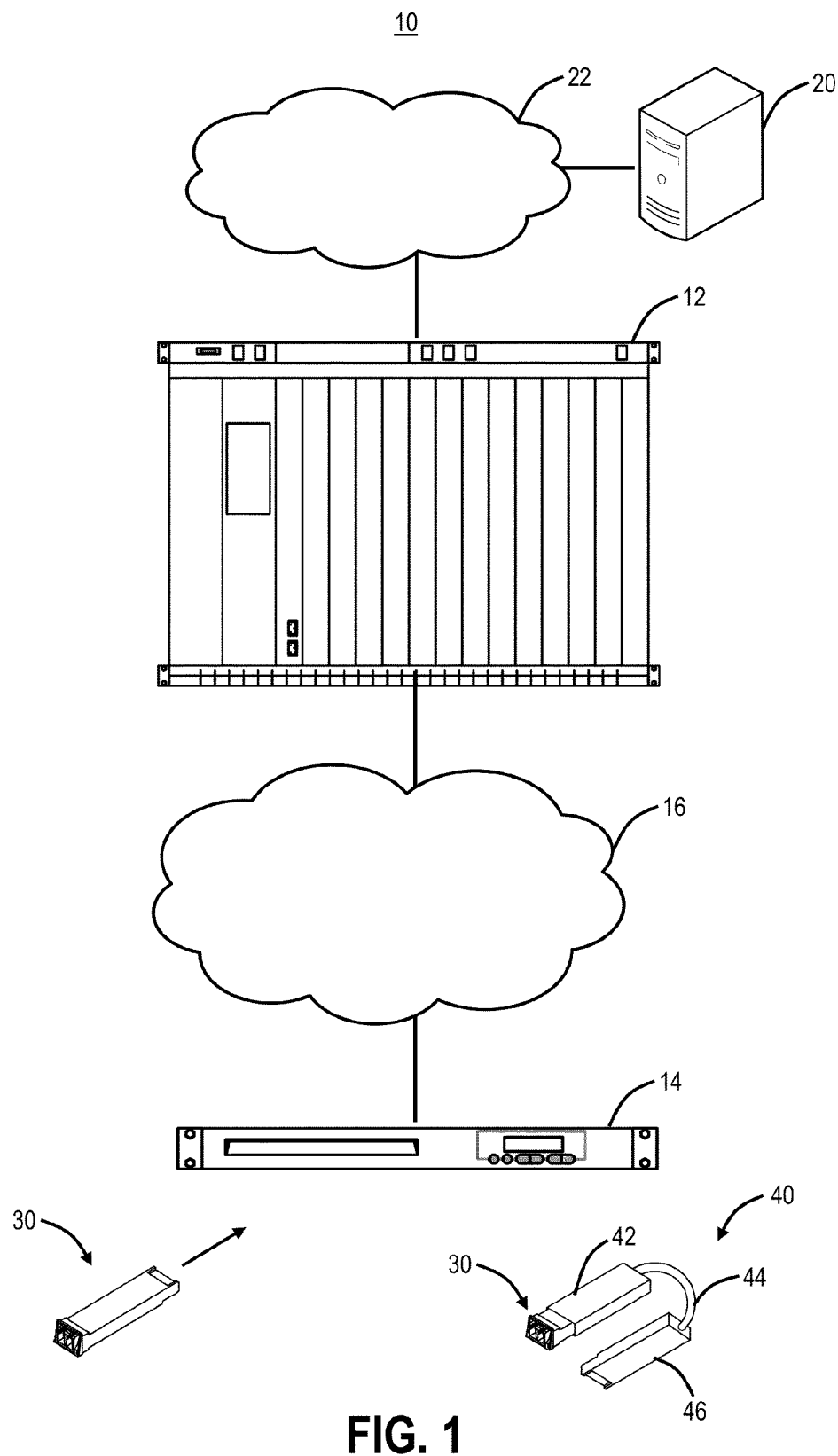
FIG. 1 is a network diagram of a network describing an exemplary application of a smart pluggable transceiver.

Referring to FIG. 1, in an exemplary embodiment, a network diagram illustrates a network 10 describing an exemplary application of a smart pluggable transceiver. The network 10 includes a network switch 12 communicatively coupled to a client device 14 through a network 16 (which can include optical and/or packet connections). The network switch 12 can also can be communicatively coupled to a network management system 20 through a data communications network 22. The client device 14 includes one or more host slots to support pluggable modules to communicate over the network 16 to the network switch 12. For example, the host slots can support SFP, XFP, SFP+, and the like.

The network switch 12 includes integrated Ethernet OAM functionality whereas the client device 14 does not support Ethernet OAM. In conventional operation, a pluggable transceiver 30 is directly plugged into the client device to form a connection over the network 16 to the network switch 12. To introduce Ethernet OAM functionality at the client device, the systems and methods include a flexible smart sleeve 40. The flexible smart sleeve 40 includes a pluggable sleeve 42 configured to selectively receive the pluggable transceiver 30, a cable 44, and a smart enclosure 46 coupled to the pluggable sleeve 42 via the cable 44.

Figure 2:
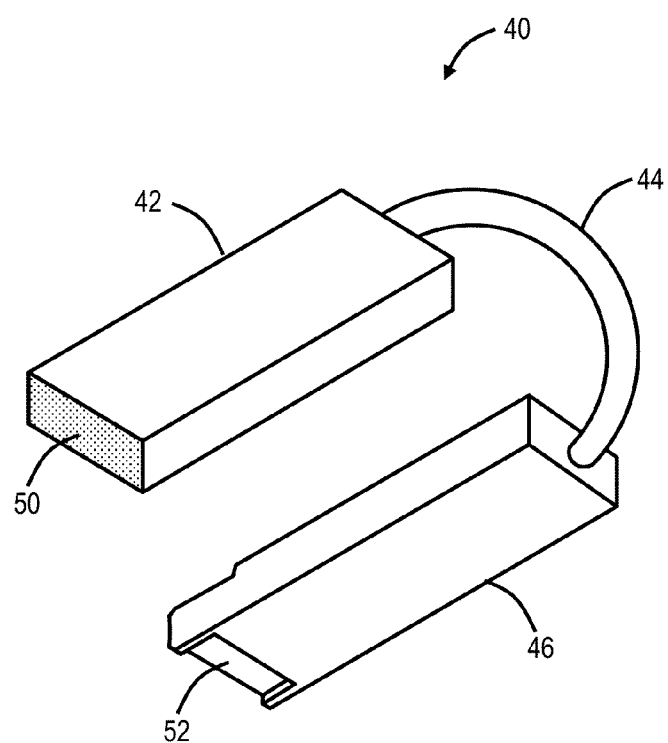
FIG. 2 is a perspective diagram of a flexible smart sleeve without the pluggable transceiver.
Figure 3:
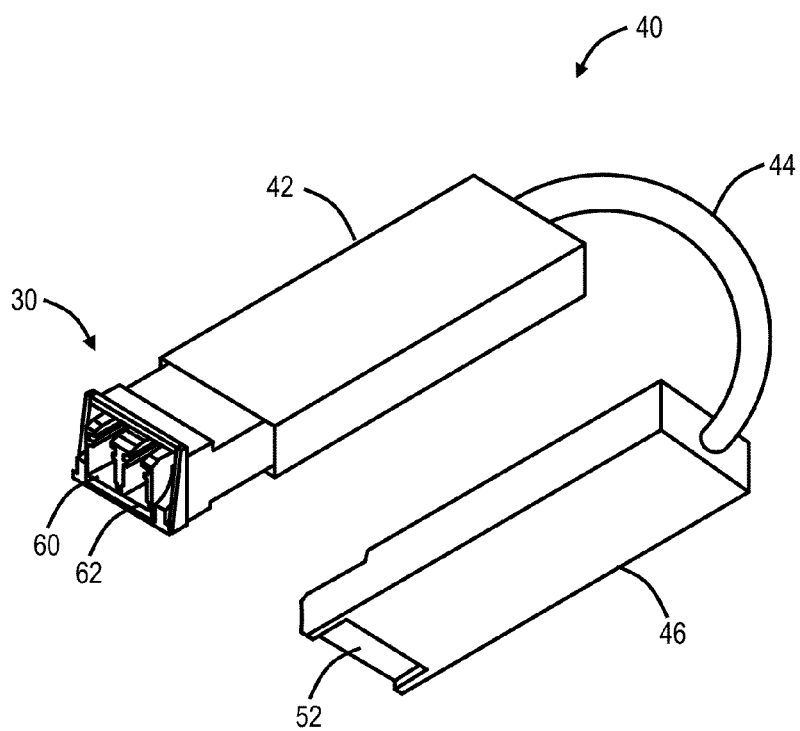
FIG. 3 is a perspective diagram of a flexible smart sleeve with the pluggable transceiver included therein.

Referring to FIGS. 2 and 3, in an exemplary embodiment, perspective diagrams illustrate the flexible smart sleeve 40 without the transceiver 30 (FIG. 2) and with the transceiver 30 (FIG. 3). Specifically, FIGS. 2 and 3 illustrate a form factor of the flexible smart sleeve 40. Specifically, the flexible smart sleeve 40 can be referred to as a smart dongle. The pluggable sleeve 42 is configured to selectively receive the transceiver 30, i.e., the pluggable sleeve 42 has the same functionality as a host slot in the client device 14. The pluggable sleeve 42 includes an opening 50 to receive the transceiver 30 as well as pin connectors (not shown) inside the pluggable sleeve 42 to for power and data connections with the transceiver 30. That is, the pluggable transceiver 30 connects to the pluggable sleeve 42 as if it were the host slot.

The smart enclosure 46 is configured to insert into a host slot such as in the client device 14 and the smart enclosure 46 includes data and power pins 52. The smart enclosure 46 has dimensions similar to the pluggable transceiver 30 and inserts into the host slot instead of the pluggable transceiver 30. The pluggable transceiver 30 inserts into the pluggable sleeve 42 and can hang off the client device 14 by the cable 44.

The cable 44 includes data and power connections from the smart enclosure 46 to the pluggable sleeve 42. In this manner, the pluggable sleeve 42 and the smart enclosure 46 act as an extension. The cable 44 is flexible and can have a variable length as needed. In an exemplary embodiment, the cable 44 can be about two inches; although other lengths are also contemplated. The cable 44 allows the pluggable sleeve 42 to point in any direction when installed in a customer location.

The flexible smart sleeve 40 solves two major limitations as described herein—1) the end customer can use any brand of the pluggable transceiver 30 and 2) a form factor that allows the pluggable transceiver 30 to be installed in tight locations. That is, the pluggable sleeve 42 supports any MSA-compliant transceiver. For example, if the pluggable sleeve 42 is SFP-compliant, the pluggable transceiver 30 can be any SFP-compliant pluggable transceiver.

From a space perspective, the smart enclosure 46 takes no more depth than current MSA-compliant pluggable transceivers with optical connectors 60, 62 installed and the flexible cable 44 allows the pluggable sleeve 42 to hang down. This also the end customer/installer to route cables in any direction, up, down, or sideways, because the cable 44 is flexible between the pluggable sleeve 42 and the smart enclosure 46.

In various exemplary embodiments, the flexible smart sleeve 40 can support various different types of the pluggable transceiver 30 such as, without limitation, SFP, SFP+, XFP, X2, XENPAK, etc. Specifically, for a given MSA, there are various specifications for mechanical, electrical, etc. characteristics of the pluggable transceiver 30 and a host device capable of receiving the pluggable transceiver 30. The pluggable sleeve 42 has the associated characteristics of the host device, and the smart enclosure 46 has the associated characteristics of the pluggable transceiver 30. In this manner, the smart enclosure 46 acts as the pluggable transceiver 30 when plugged into the host device. The pluggable sleeve 42 acts as the host device for the pluggable transceiver 30 and the cable 44 connects the two thereby providing an extension.

For example, when the pluggable transceiver 30 is an SFP-compliant transceiver, the smart enclosure 46 has a height of 8.5 mm (0.33 inches), width of 13.4 mm (0.53 inches), and depth of 56.5 mm (2.22 inches). When the pluggable transceiver 30 is an XFP-compliant transceiver, the smart enclosure 46 has a height of 8.5 mm (0.33 inches), width of 18.35 mm (0.72 inches), and depth of 78.0 mm (3.10 inches). Also, the pluggable sleeve 42 has the appropriate dimensions to fit the pluggable transceiver 30 along with the appropriate connectors. The pluggable sleeve 42 can also be configured to lock the pluggable transceiver 30 in place using a latch or other suitable mechanical technique.

Figure 4:
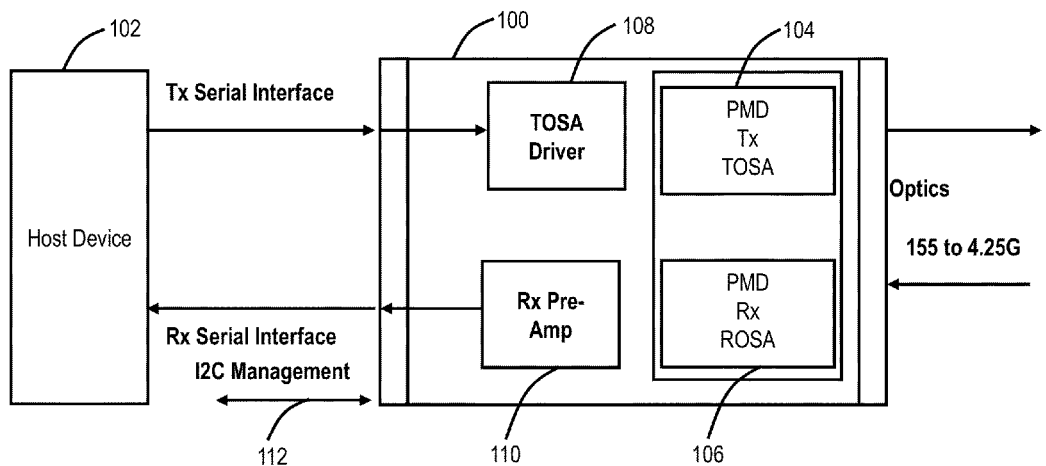
FIG. 4 is a block diagram of a conventional SFP (without the flexible smart sleeve)

Referring to FIG. 4, in a conventional embodiment, a block diagram illustrates a conventional SFP 100 (without the flexible smart sleeve 40). The SFP 100 is configured to plug into an SFP-compliant host device 102 for a TX serial interface, a RX serial interface, power, and an Inter-Integrated Circuit (I2C) management interface. SFP transceivers are available with a variety of different Physical Medium Dependent (PMD) Transmitter Optical Subassemblies (TOSA) 104 and Physical Medium Dependent (PMD) Receiver Optical Subassemblies (ROSA) 106.

This allow users to select the appropriate transceiver for each link to provide the required optical reach over the available optical fiber type (e.g. multi-mode fiber or single-mode fiber). Optical SFP modules 100 are commonly available in four different categories: 850 nm (SX), 1310 nm (LX), 1550 nm (ZX), and DWDM. SFP transceivers 100 are also available with a "copper" cable interface, allowing the host device 102 designed primarily for optical fiber communications to also communicate over unshielded twisted pair networking cable. There are also Coarse Wave Division Multiplexing (CWDM) and single-optic (1310/1490 nm upstream/downstream) SFPs.

The SFP transceiver 100 is specified by a Multi-Source Agreement (MSA) between competing manufacturers. For example, SFF Committee has published INF-8074i Specification for SFP (Small Formfactor Pluggable) Transceiver (May 2001), the contents of which are incorporated by reference herein and available online at ftp.seagate.com/sff/INF-8074.PDF. The SFP transceiver 100 is commercially available with capability for data rates up to 4.25 Gbps or higher. The SFP transceiver 100 also supports digital optical monitoring (DOM) functions according to the industry-standard SFF-8472 Multi-Source Agreement (MSA). This feature gives an end user the ability to monitor real-time parameters of the SFP, such as optical output power, optical input power, temperature, laser bias current, and transceiver supply voltage.

The SFP transceiver 100 includes a TOSA driver 108 which is configured to interface to a Tx serial interface on the host device 102. The TOSA driver 108 provides the serial input to the PMD Tx TOSA 104. The PMD Rx ROSA 106 is configured to receive an optical signal and provide the received optical signal to a Rx pre-amp 110 which interfaces to a Rx serial interface on the host device 102. Additionally, the SFP transceiver 100 includes an I2C management interface 112 which interfaces to the host device 102 to provide the DOM and other MSA-based communications. Note, in the SFP MSA, the I2C management interface 112 has very limited functions.

Note, while FIG. 4 illustrates the SFP transceiver 100, the flexible smart sleeve 40 contemplates other types of pluggable transceivers. The XFP (10 Gigabit Small Form Factor Pluggable) is a hot-swappable, protocol independent optical transceiver, typically operating at 1310 nm or 1550 nm, for 10 Gigabit SONET/SDH, Fiber Channel, Gigabit Ethernet and other applications. The XFP MSA is available from www.sfplustransceiver.com/xfp-msa and is herein incorporated by reference. The XFP MSA defines a specification for a module, cage hardware, and IC interfaces for a 10 Gbps hot pluggable module converting serial electrical signals to external serial optical or electrical signals. The technology is intended to be flexible enough to support bit rates between 9.95 Gbps and 11.1 Gbps for services such as OC-192/STM-64, 10G Fiber Channel, G.709, and 10G Ethernet. XFP supports native G.709 signals.

The X2 MSA defines a small form-factor 10 Gbps pluggable fiber optic transceiver optimized for 802.3ae Ethernet, ANSI/ITUT OC192/STM-64 SONET/SDH interfaces, ITU-T G.709, OIF OC192 VSR, INCITS/ANSI 10 GFC (10 Gigabit Fiber Channel) and other 10 Gigabit applications. X2 is physically smaller than XENPAK but maintains the same electrical I/O specification defined by the XENPAK MSA and continues to provide robust thermal performance and electromagnetic shielding. X2 uses the same 70-pin electrical connectors as XENPAK supporting four wire XAUI (10-gigabit attachment unit interface). The X2 MSA is available at ftp.seagate.com/sff/INF-8476.PDF and is hereby incorporate by reference.

The XENPAK MSA supports the proposed 802.3ae IEEE 10 Gigabit Ethernet (10 GbE) standard, and specifies a uniform form factor, size, connector type and electrical pin-outs. XENPAK simplifies management of architecture shifts and integration, minimizes system costs, ensures multiple vendors for market supply, and guarantees thermal performance for high density 10 GbE ports. The XENPAK 202 MSA is available at ftp.seagate.com/sff/INF-8474.PDF and is hereby incorporated by reference.

The SFP+ MSA is a specification for a pluggable, hot-swappable optical interface for SONET/SDH, Fiber Channel, Gigabit Ethernet, and other applications. SFP+ is designed for up to 80 km reach and supports a full-range of applications. SFP+ is similar in size and power with the XFP specification, and similarly accepts a serial electrical input.

Figure 5:
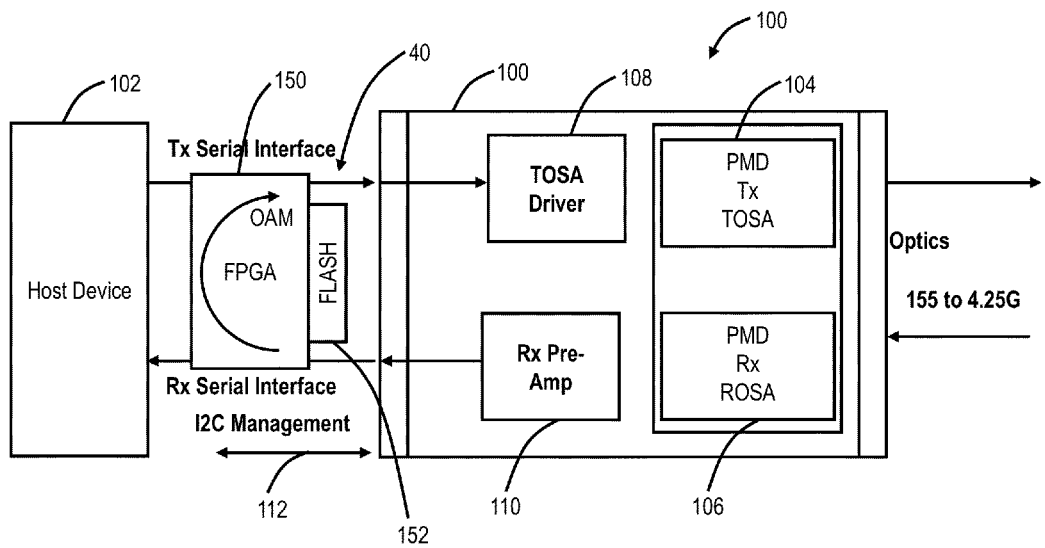
FIG. 5 is a block diagram of the conventional SFP of FIG. 4 with the flexible smart sleeve.

Referring to FIG. 5, in an exemplary embodiment, a block diagram illustrates the conventional SFP 100 with the flexible smart sleeve 40. Specifically, FIG. 5 illustrates smart functionality associated with the flexible smart sleeve 40. The flexible smart sleeve 40 can include circuitry including a FPGA 150 and flash memory 152. The FPGA 150 and the flash memory 152 can be located in the pluggable sleeve 42 and/or the smart enclosure 46. Note, while illustrated as an FPGA, the FPGA 150 can also include an ASIC or other type of circuitry.

The FPGA 150 is configured to perform Ethernet OAM functions and the flash memory 152 is configured to store associated data. The FPGA 150 is configured to extract and/or insert Ethernet OAM packets. Specifically, the FPGA 150 can extract Ethernet OAM packets from the Rx serial interface and insert Ethernet OAM packets to the Tx serial interface. In this manner, the Ethernet OAM packets are transparent to the host device 102, i.e., the client device 14.

The Ethernet OAM packets can be processed at the network switch 12 and incorporated into the network management system 20. This allows the network operator, of the network switch 12, to have OAM access to the client device 14. In an exemplary embodiment, the network switch 12 includes the network management system 20 (e.g., the network switch 12 and the network management system 20 are either from a same manufacturer and/or utilize a standard or proprietary interface for integration). The flexible smart sleeve 40 can thus be integrated to the network management system 20 providing a network operator visibility at customer interface ports on low-end devices.

The Ethernet OAM can include, without limitation, ITU-T Recommendation G.8013/Y.1731 (November 2013), "OAM functions and mechanisms for Ethernet based networks"; IETF RFC 2544 (March 1999), "Benchmarking Methodology for Network Interconnect Devices"; IEEE 802.3ah Ethernet in the first mile; and IEEE 802.1ag Connectivity Fault Management; IEEE 1588-2002 and IEEE 1588-2008, "Standard for a Precision Clock Synchronization Protocol for Networked Measurement and Control Systems"; IETF RFC5357 (October 2008) A Two-Way Active Measurement Protocol (TWAMP), the contents of all are incorporated by reference herein.

Figure 6:
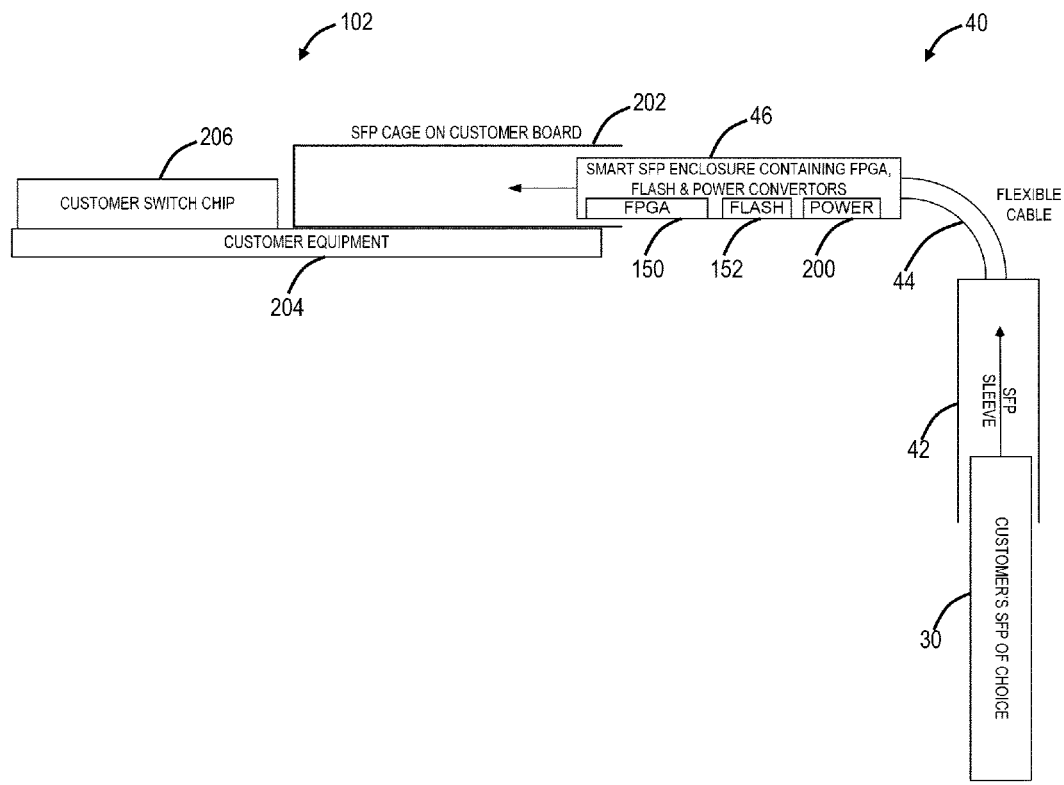
FIG. 6 is a block diagram of the flexible smart sleeve interfacing the host device with the FPGA and the flash memory in the smart enclosure.

Referring to FIG. 6, in an exemplary embodiment, a block diagram illustrates the flexible smart sleeve 40 interfacing the host device 102 with the FPGA 150 and the flash memory 152 in the smart enclosure 46. Specifically, the smart enclosure 46 has a form factor that is similar to the form factor of the pluggable transceiver 30. The smart enclosure 46 has power circuitry 200 that is configured to receive power from a cage 202 on the host device 102. Specifically, the smart enclosure 46 appears as the pluggable transceiver 30 to the cage 202 and interfaces to the cage 202 for power (e.g., 3.3V) and data. The cage 202 is located on a circuit board 204 associated with customer equipment, e.g., in the client device 14.

The flexible cable 44 extends the power and data from the smart enclosure 46 from the cage 202 to the pluggable sleeve 42. The pluggable transceiver 30 plugs into the pluggable sleeve 42 and interfaces to the smart enclosure 46 through the flexible cable 44. Thus, the flexible smart sleeve 40 acts as an extension for the pluggable transceiver 30. If the pluggable transceiver 30 utilized a non-flexible sleeve, the pluggable transceiver 30 would stick out from the cage 202 by several inches, and would not fit in cabinets or the like. Instead, the pluggable transceiver 30 does not stick out, but may lay flush.

Figure 7:
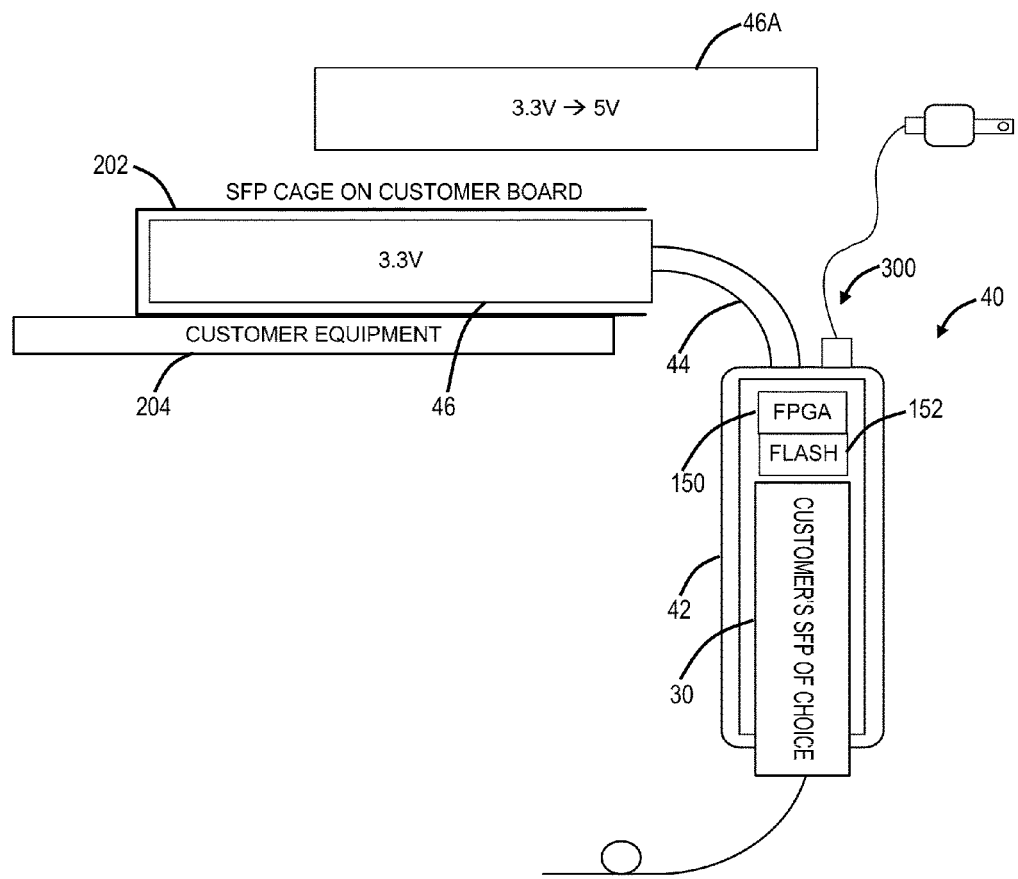
FIG. 7 is a block diagram of the flexible smart sleeve interfacing the host device with the FPGA and the flash memory in the pluggable sleeve.

Referring to FIG. 7, in an exemplary embodiment, a block diagram illustrates the flexible smart sleeve 40 interfacing the host device 102 with the FPGA 150 and the flash memory 152 in the pluggable sleeve 42. Here, in FIG. 7, the smart enclosure 46 provides power and extends the electrical connections via the cable 44 to the pluggable sleeve 42. The pluggable sleeve 42 includes the FPGA 150 and the flash 152.

In both exemplary embodiments of FIGS. 6 and 7, the smart enclosure 46 is configured to get power from the cage 202 and the circuit board 204. In SFP, the power can be 3.3V. In other MSAs, the power can be as specified. However, this may not be enough power to support the FPGA 150 and the flash 152. In an exemplary embodiment, the smart enclosure 46 can support additional power, such as through a smart enclosure 46A that supports additional power such as 5V (although this may be outside of the MSA specifications). In another exemplary embodiment, the flexible smart sleeve 40 may support additional power through an external connection 300, such as a Universal Serial Bus (USB), Power over Ethernet (POE), etc. connection. In a further exemplary embodiment, the flexible smart sleeve 40 may support additional power through spare (unused) SFP connectors on the customer equipment 204 such as through the smart enclosure 46A being plugged into the spare (unused) SFP connectors and connected to the flexible smart sleeve 40 through a cable to provide the additional power. Additional power enables the FPGA 150 and the flash 152 to support additional functionality related to Ethernet OAM. Note, the additional power described herein is optional, and the flexible smart sleeve 40 contemplates operation without the additional power.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A flexible smart sleeve system for a pluggable transceiver, the system comprising:
    a pluggable sleeve configured to selectively engage a pluggable transceiver;
    a smart enclosure configured to selectively engage a host device, wherein the host device is configured for the pluggable transceiver;
    a flexible cable connecting the pluggable sleeve to the smart enclosure for providing power and data connections between the pluggable sleeve and the smart enclosure; and
    circuitry configured to communicate to the pluggable transceiver and to perform Operations, Administration, and Maintenance (OAM) with a network switch communicatively coupled to the pluggable transceiver.

2. The flexible smart sleeve system of claim 1, wherein the circuitry is disposed in the pluggable sleeve.

3. The flexible smart sleeve system of claim 1, wherein the circuitry is disposed in the smart enclosure.

4. The flexible smart sleeve system of claim 1, wherein the network switch is communicatively coupled to a network management system and provides OAM from the flexible smart sleeve system to the network management system.

5. The flexible smart sleeve system of claim 1, wherein the circuitry comprises a Field Programmable Gate Array (FPGA) configured to perform OAM and flash memory configured to store data associated with OAM.

6. The flexible smart sleeve system of claim 1, wherein the OAM utilizes any of ITU-T Recommendation G.8013/Y.1731 (November 2013), IETF RFC 2544 (March 1999), IEEE 1588-2002 and IEEE 1588-2008, and IETF RFC5357 (October 2008).

7. The flexible smart sleeve system of claim 1, wherein the smart enclosure comprises first connectors to engage the host device for power and data, wherein the pluggable sleeve comprises second connectors, and wherein the flexible cable is configured to connect the first connectors to the second connectors.

8. The flexible smart sleeve system of claim 1, wherein the pluggable transceiver is one of a Small Form-factor Pluggable (SFP) module, a 10 Gigabit Small Form Factor Pluggable Module (XFP), and an Enhanced SFP (SFP+) module.

9. The flexible smart sleeve system of claim 1, wherein the smart enclosure is inserted in a customer premises located client device and the pluggable sleeve dangles in front of the customer premises located switch by the flexible cable.

10. The flexible smart sleeve system of claim 1, further comprising:
an external power connection configured to provide additional power in addition to power from the host device to the smart enclosure, wherein the additional power is utilized to power the circuitry.

11. The flexible smart sleeve system of claim 10, wherein the external power connection is a Universal Serial Bus (USB) connection or a connection to an unused port on the host device.

12. A network with a flexible smart sleeve system for a pluggable transceiver, the network comprising:
a network switch;
a customer premises switch comprising a host cage configured for the pluggable transceiver; and
a flexible smart sleeve system configured to engage the host cage and to engage the pluggable transceiver, wherein the flexible smart sleeve system is configured to provide Operations, Administration, and Maintenance (OAM) to the network switch;
wherein the flexible smart sleeve system comprises:
a pluggable sleeve configured to selectively engage the pluggable transceiver;
a smart enclosure configured to selectively engage the host cage;
a flexible cable connecting the pluggable sleeve to the smart enclosure for providing power and data connections between the pluggable sleeve and the smart enclosure; and
circuitry disposed in the pluggable sleeve or in the smart enclosure, wherein the circuitry is configured to communicate to the pluggable transceiver and to perform the OAM.

13. The network of claim 12, wherein the network switch is communicatively coupled to a network management system and provides the OAM from the flexible smart sleeve system to the network management system.

14. The network of claim 12, wherein the OAM is exchanged between the flexible smart sleeve system and the network switch, and the OAM is not provided to the customer premises switch.

15. The network of claim 12, wherein the OAM utilizes any of ITU-T Recommendation G.8013/Y.1731 (November 2013), IETF RFC 2544 (March 1999), IEEE 1588-2002 and IEEE 1588-2008, and IETF RFC5357 (October 2008).

16. The network of claim 12, wherein the customer premises switch has a cover and the flexible smart sleeve system is installed in the customer premises switch enabling the cover to close.

17. A method with a flexible smart sleeve system for a pluggable transceiver, the method comprising:
inserting a smart enclosure of the flexible smart sleeve system in a host device;
inserting the pluggable transceiver in a pluggable sleeve of the flexible smart sleeve system, wherein the pluggable sleeve is connected to the smart enclosure through a flexible cable, wherein the flexible cable extends power and data from the smart enclosure to the pluggable sleeve; and
communicating to the pluggable transceiver and performing Operations, Administration, and Maintenance (OAM) with a network switch communicatively coupled to the pluggable transceiver, through circuitry disposed in the flexible smart sleeve system.

* * * * *